United States Patent

(12) United States Patent
Oak

(10) Patent No.: US 10,060,548 B1
(45) Date of Patent: Aug. 28, 2018

(54) TORQUE REDUCER FOR HIGH-PRESSURE GATE VALVES

(71) Applicant: Worldwide Oilfield Machine, Inc., Houston, TX (US)

(72) Inventor: Ninad Ashok Oak, Katraj-Pune (IN)

(73) Assignee: Worldwide Oilfield Machine, Inc., Houston, TX (US)

( * ) Notice: Subject to any disclaimer, the term of this patent is extended or adjusted under 35 U.S.C. 154(b) by 0 days.

(21) Appl. No.: 15/653,960

(22) Filed: Jul. 19, 2017

Related U.S. Application Data

(60) Provisional application No. 62/508,018, filed on May 18, 2017, provisional application No. 62/504,107, filed on May 10, 2017, provisional application No. 62/464,552, filed on Feb. 28, 2017.

(51) Int. Cl.
*F16K 31/50* (2006.01)
*F16K 31/53* (2006.01)
*F16K 3/26* (2006.01)
*F16K 3/02* (2006.01)

(52) U.S. Cl.
CPC ............ *F16K 31/535* (2013.01); *F16K 3/26* (2013.01); *F16K 31/508* (2013.01); *F16K 3/0209* (2013.01); *F16K 3/0254* (2013.01)

(58) Field of Classification Search
CPC ........ F16K 31/508; F16K 3/26; F16K 31/535; F16K 3/0254; F16K 3/0209
USPC ............... 251/326–329, 229, 297, 266–267; 74/89.45; 192/95
See application file for complete search history.

(56) References Cited

U.S. PATENT DOCUMENTS

| | | | | |
|---|---|---|---|---|
| 4,569,503 A * | 2/1986 | Karr, Jr. | ............ | F16K 31/1221 251/327 |
| 5,046,376 A * | 9/1991 | Baker | ................ | F16K 31/1221 74/89.45 |
| 6,918,574 B2 * | 7/2005 | Hallden | ................ | F16K 3/0254 251/327 |
| 7,523,916 B2 * | 4/2009 | Fenton | .................. | F16K 3/0254 251/326 |
| 2008/0217569 A1 * | 9/2008 | Holliday | .............. | F16K 3/0254 251/326 |
| 2011/0308619 A1 * | 12/2011 | Martino | .................. | E21B 34/02 251/264 |

* cited by examiner

Primary Examiner — John Bastianelli
(74) Attorney, Agent, or Firm — Kenneth L. Nash; Thomas D. Nash

(57) ABSTRACT

A torque reducer assembly including a ball screw assembly and a plunger gear assembly with a low torque allowing a single user to operate a hand wheel to open or close a valve under very high pressure without need of gear reduction and a balance stem. A gear shaft, ball screw, valve stem and gate are fixed from rotation with respect to each other but move axially together in response to rotation of a ball screw nut in the ball screw assembly. The plunger gear assembly rotates with the ball screw nut. In the engaged position, a plunger prevents rotation of the ball screw nut in the valve open direction but permits rotation of the ball screw nut in the valve close direction. In the disengaged position, the plunger permits rotation of the ball screw nut in the valve open direction and the valve close direction.

16 Claims, 9 Drawing Sheets

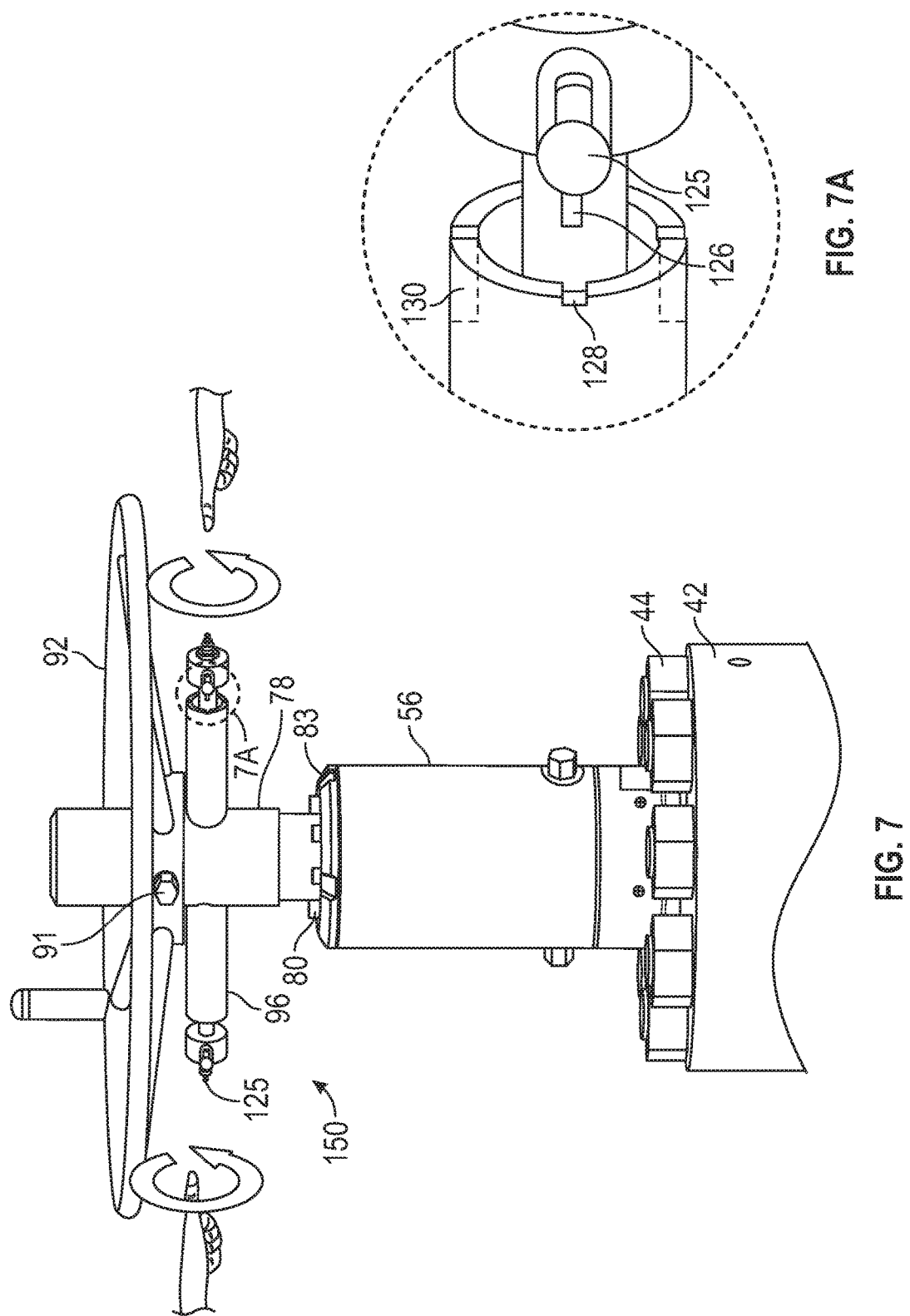

TORQUE REDUCER FOR HIGH-PRESSURE GATE VALVES

This application claims benefit of U.S. provisional application 62/464,552 filed Feb. 28, 2017, U.S. provisional application 62/504,107 filed May 10, 2017, and U.S. provisional application 62/508,018 filed May 18, 2017, which are each incorporated herein in their entirety.

BACKGROUND OF THE INVENTION

Field of the Invention

The present invention relates generally to torque reduction for high pressure rising stem gate valves and more specifically to a Torque Reducer with an improved ball screw assembly and a novel gear plunger assembly for an unbalanced rising stem gate valve that allows use of a hand wheel to operate a high pressure valve without need for the valve to include a gear box or a Balance Stem.

Background of the Invention

High pressure gate valves may include valves capable of handling high pressures including, for example, valves for $4\frac{1}{16}$" bore size at 10000 PSI and 3" bore size at 15000 PSI and above.

Gate valves are used in a variety of industries to control the flow of fluids. In particular, gate valves are used extensively in the oil & gas industries to control the flow of produced fluids of various stages of production. Most gate valves used in industry comprise a valve body having a longitudinal flow bore and a transverse gate cavity that intersects the flow bore. A gate having a gate opening extending transversely therethrough is disposed in the gate cavity. A stem is provided for moving the gate between open positions, in which the gate opening is aligned with the flow bore. The gate is usually positioned between a pair of seats, each of which seals against the gate under pressure to prevent fluid from passing through the flow bore when the gate is in the closed position.

The gate cavity is normally covered by a bonnet having an axial through bore. The stem passes through the through bore and is sealed to the bonnet by a stem packing to contain the fluid pressure within the gate cavity.

Many gate valves are also provided with a backseat mechanism, that is, corresponding sealing surfaces on the stem and the bonnet which are located below the stem packing.

Often a desire exists to replace the stem packing without removing the gate valve from the conduit system to which it is connected. In such instances, the stem is moved upwardly until the backseat sealing surfaces on the stem and the bonnet are engaged to form a metal-to-metal seal. This back seating procedure thus isolates the stem from the gate cavity and allows the desired maintenance to be performed without having to remove the gate valve from the conduit system. For safety reasons, the pressure in the gate cavity is bled down to ambient pressure before any maintenance is performed. In addition, any residual pressure between the stem packing and the backseat is usually bled off through a bleeder plug provided in the bonnet.

Gate valves are provided with means for manipulating the stem to raise and lower the gate. In this respect, gate valves may be divided into two groups; (a) rising stem gate valves and (b) non-rising stem gate valves. In a non-rising (or rotating) stem gate valve, the stem is threadedly connected to the gate valve such that rotation of the stem causes the gate to move up and down. An actuation mechanism is provided for selectively rotating the stem clockwise or counterclockwise in order to open or close the gate valve. On this type of gate valve, the backseat is set by driving the gate down until it bottoms out on the valve body. Then the stem is moved upwardly until it backseats against the bonnet. Such valves may be automatically or remotely actuated, such as by an electric motor. Alternatively, these gate valves may be manually actuated, such as by a hand wheel adapted to rotate the stem directly.

In a rising stem gate valve, the stem is attached to the gate in a manner which prevents rotational movement of the stem relative to the gate. A mechanism is then provided for selectively driving the stem up and down in order to open and close the valve. On this type of gate valve, the backseat is set by moving the stem and gate upwards until the stem backseats against the bonnet. Such valves may be automatically and remotely actuated, such as by a hydraulic cylinder. Alternatively these valves may be manually actuated by providing a transmission means to convert the rotational motion of a hand wheel into axial motion of the stem.

Rising stem gate valves can be further divided into two types: (a) Balance Stem Gate Valves and (b) Unbalanced Stem Gate Valves.

In a Balanced Stem Gate Valve, a second stem is attached to the gate at the end opposite the first stem. Balanced stem gate valves are well known and a typical example might be U.S. Pat. No. 4,281,819 for a Balanced Stem Gate Valve, which is incorporated herein as background information, that shows a lower stem or Balance Stem attached to the gate of the gate valve and/or other means to Balance the Stem and discusses other Balance Stem gate valves.

It will be appreciated that when pressurized fluid is present in the gate cavity, a force is exerted on each stem which is equal to the product of the pressure and the cross-sectional area of the stem where it passes through the stem packing. In a Balance Stem Gate Valve, the forces acting on the two stems will cancel each other out, resulting in substantially zero (or a balanced) net force to overcome when moving the gate. This configuration is useful to prevent the unbalanced force accidentally opening the valve.

The disadvantages of Balance Stem gate valves includes increased cost, increased overall height, increased complexity and the creation of an additional potential leak path between the second stem and the corresponding stem packing.

In the case of Rising and Non-Rising Stems, the transmission means is a direct threaded connection between the hand wheel and the stem. Unfortunately, for many large or high pressure valves which require large actuating forces, this method requires more torque to be applied to the hand wheel than is practical to exert by hand. Hence to overcome large actuating forces, three to four persons may be required to operate the valve.

When the valve is closed, the entire upstream side of the gate is exposed to the full working pressure of the fluid while a portion of the downstream side of the gate is often at ambient pressure. This pressure differential results in very high forces which push the gate against the downstream seat. This engagement between the gate and the downstream seat in turn creates large gate-to-seat drag forces, which must be overcome when the gate is moved from the closed position to the open position. Another force that must be overcome is the drag which the stem packing exerts on the stem.

In order to maintain the required hand wheel torque at an acceptable level, a transmission means such as a gear box, which creates a substantial mechanical advantage, must usually be utilized in prior art high pressure gate valves. One disadvantage of this device is that, in order to sufficiently reduce the required torque on the hand wheel, the gear ratio must be very high. Consequently, a large number of turns are required to open or closed the valve, which adds fatigue to users rotating the hand wheel. For example, to fully open a three inch 20000 PSI valve, a gear operated valve may require rotation of the hand wheel about 90 revolutions and results in the relatively slow movement of the gate valve for each revolution of the hand wheel. Moreover the torque required to overcome the drag of the gates due to high differential pressure and the drag of the packing is considerable and becomes ever greater as the pressures increase.

The slow movement of the gate is especially troublesome when moving the gate from the closed position to the open position. As soon as the gate opening intersects the flow bore in the downstream seat, the gate-to-seat seal is broken and a high velocity jet of fluid is forced through the intersection area. In many cases, the fluid may contain abrasive particles which tend to erode the valve components during high velocity flow. The longer the intersection area remains small, the longer it takes for pressure to equalize on the opposite sides of the gate. Thus, the slower the gate moves to the open position it creates more wear and tear of gate and seats.

Gate valves may additionally utilize a Balance Stem that limits the force acting on the gate if the upstream seal fails. Otherwise, the back pressure developed in the valve cavity would act on an unbalanced stem and would try to push the gate upwards with a tendency to open the valve automatically due to low torque of the ball screw mechanism. To compensate, the balanced stem gate valve is introduced to nullify the pressure that would otherwise act on an unbalanced stem. In a Balanced Stem gate valve, the forces acting on the two stems will cancel each other out, resulting in zero or substantially zero (or a balanced) net force acting on the gate to overcome when moving the gate. However, the drag forces discussed above still cause resistance to movement. Moreover the drag forces increase with increasing high pressure. There is also a chance of the valve opening automatically in partial open condition due to low torque of the ball screw mechanism, which is very dangerous and could even lead to a massive accident.

However, disadvantages of Balance Stem gate valves include increased cost and complexity. The Balance Stem creates an additional potential leak path between the second stem and the corresponding stem packing. Another disadvantage is a resulting height restriction.

It would be desirable to avoid the need for a Balance Stem or a gear box in a high pressure rising stem gate valve. It would also be desirable to provide an improved ball screw mechanism that further reduces the torque required to operate high pressure rising stem gate valves. It would also be desirable to avoid the damage caused due to the slow movement of the gate when using a gear box. It would also be desirable to provide a high pressure rising stem gate valve with such a reduced torque that a single user can easily open the gate valve. Further, it would be desirable that the gate also closes easily. Consequently, those skilled in the art will appreciate the present invention that addresses the above and/or other problems.

SUMMARY OF THE INVENTION

One possible object of the present invention is to provide a high pressure rising stem gate valve without the need for a Balance Stem that can be easily operated.

Because opening a high pressure gate valve is the most difficult operation and requires the highest torque on a hand wheel due to increasing drag of the gate along the seat with increasing high differential pressure across the gate, another object of the present invent is to provide a gate valve that actually opens more easily and much faster as the high pressure increases.

Another possible object of the present invention is a high pressure gate valve with a gate that moves axially much faster than a balanced stem gate valve with gear box to avoid damage to the gate making the high pressure gate valve more reliable and longer lasting than prior art gate valves.

Another possible object of the present invention is to provide a high pressure rising stem gate valve that can be readily operated with a hand wheel without the need of a gear box.

Another possible object of the present invention is to provide a high pressure gate valve that is shorter in height without Balance stem for better installation flexibility.

Another advantage is that the gate valve of the present invention is more compact in height which gives more flexibility to accommodate for any application.

Another advantage is that the high pressure rising stem gate valve also eliminates one of the leak paths due to the Balance Stem.

A torque reducer assembly includes a ball screw assembly and a plunger gear assembly that allows use of a hand wheel to operate a high pressure rising stem gate valve without need of a gear box and Balance Stem. A gear shaft, ball screw, valve stem and gate are fixed from rotation with respect to each other but move axially together in response to rotation of a ball screw nut in the ball screw assembly. The plunger gear assembly rotates with the ball screw nut. A plunger is movable between an engaged position with the gear shaft and a disengaged position with the gear shaft. In the engaged position, the plunger prevents rotation of the ball screw nut in the valve open direction but permits rotation of the ball screw nut in the valve close direction. In the disengaged position, the plunger permits rotation of the ball screw nut in the valve open direction and the valve close direction.

One general aspect comprises a rising stem gate valve to control high pressures of at least 5000 psi, the rising stem gate valve comprising: a valve that defines therein a flow bore through the valve and a gate cavity that intersects the flow bore. The rising stem gate valve also comprises a gate disposed in the gate cavity across the flow bore. The gate is axially moveable between a valve open position to allow flow through the flow bore and a valve closed position to prevent flow through the flow bore. The rising stem gate valve also comprises a valve stem that is axially movable with the gate; the valve stem is fixed from rotation with respect to the gate. The rising stem gate valve also comprises a torque reducer assembly comprising a ball screw assembly and a plunger gear shaft assembly. The ball screw assembly comprises a ball screw operatively connected to the gate and the valve stem. The ball screw is fixed from rotation with respect to the gate and the valve stem. The ball screw is axially movable with the valve stem and the gate. A ball screw nut is in surrounding relationship to the ball screw.

The ball screw assembly is connected so that rotation of the ball screw nut in a valve open direction axially moves the gate towards the valve open position, and rotation of the ball screw nut in a valve close direction axially moves the gate towards the valve closed position.

The plunger gear shaft assembly comprises a gear shaft connected to be axially movable with the ball screw, the valve stem, and the gate. The gear shaft is fixed from rotation with respect to the ball screw, the valve stem, the gear shaft and the gate. A plunger is operatively connected for rotation around the gear shaft with rotation of the ball screw nut. The plunger is movable between an engaged position with the gear shaft and a disengaged position with the gear shaft.

In the engaged position, the plunger gear shaft assembly is connected to prevent rotation of the ball screw nut in the valve open direction while allowing rotation in the valve close direction. In the disengaged position, the plunger is disengaged from the gear shaft to permit rotation of the ball screw nut in the valve open direction and the valve close direction.

Implementations may include one or more of the following features:

The rising stem gate valve further comprises a plurality of plungers moveable between the engaged position and the disengaged position.

The rising stem gate valve where the plunger gear shaft assembly further comprises a spring connected to the plunger to bias the plunger into engagement with the gear shaft.

The rising stem gate valve where the plunger gear shaft assembly further comprises a plunger housing, the plunger housing is rotatable around the gear shaft with rotation of the ball screw nut.

The rising stem gate valve where the plunger gear shaft assembly further comprises a plunger handle operatively connected to the plunger for movement of the plunger between the engaged position and disengaged position.

The rising stem gate valve further comprising a hand wheel secured to a ball nut driver for rotation with the plunger housing. The hand wheel is operatively connected to the ball screw nut so that the ball nut driver, the plunger housing and the ball screw nut rotate together at the same speed.

The rising stem gate valve wherein the valve stem comprises an unbalanced valve stem.

The rising stem gate valve further comprises an angular contact bearing in surrounding relationship to the ball screw assembly.

Another general aspect comprises a method for providing a rising stem gate valve to control high pressures of at least 5000 psi.

The method comprises: providing a valve that defines therein a flow bore through the valve and a gate cavity that intersects the flow bore. The method also comprises disposing a gate in the gate cavity across the flow bore. The gate is axially moveable between a valve open position to allow flow through the flow bore and a valve closed position to prevent flow through the flow bore. The method also comprises providing a valve stem that is axially movable with the gate. The valve stem is fixed from rotation with respect to the gate. The method also comprises providing a torque reducer assembly that comprises a ball screw assembly and a plunger gear shaft assembly.

Other steps comprise providing a ball screw operatively connected to the gate and the valve stem, providing that the ball screw is fixed from rotation with respect to the gate and the valve stem, and providing that the ball screw is axially movable with the valve stem and the gate. Other steps comprise providing a ball screw nut in surrounding relationship to the ball screw; providing that the ball screw assembly is connected so that rotation of the ball screw nut in a valve open direction axially moves the gate towards the valve open position; and providing that rotation of the ball screw nut in a valve close direction axially moves the gate toward the valve closed position.

The method also comprises providing a gear shaft connected to be axially movable with the ball screw, valve stem, and the gate; providing that the gear shaft is fixed from rotation with respect to the ball screw, the valve stem, the gear shaft and the gate; and providing a plunger operatively connected for rotation around the gear shaft with rotation of the ball screw nut.

Other steps comprise providing that the plunger is movable between an engaged position with the gear shaft and a disengaged position with the gear shaft; in the engaged position the plunger gear shaft assembly is connected to prevent rotation of the ball screw nut in the valve open direction; in the disengaged position the plunger is disengaged from the gear shaft to permit rotation of the ball screw nut in the valve open direction and the valve close direction.

In one embodiment, the rising stem gate valve also comprises an operator to rotate a threaded member around a screw to thereby move the valve stem axially. The plunger gear shaft assembly comprises a gear shaft connected to be axially movable with the screw, the valve stem, and the gate. The gear shaft is fixed from rotation with respect to the screw, the valve stem, the gear shaft, and with the gate. A plunger is operatively connected for rotation around the gear shaft with rotation of the operator. The plunger is movable between an engaged position with the gear shaft and a disengaged position with the gear shaft. In the engaged position, the plunger gear shaft assembly is connected to prevent rotation of the operator in a valve open direction while allowing rotation in a valve close direction. In the disengaged position, the plunger is disengaged from the gear shaft to permit rotation of the operator in the valve open direction and the valve close direction.

BRIEF DESCRIPTION OF THE DRAWINGS

The above general description and the following detailed description are merely illustrative of the generic invention. Additional modes, advantages, and particulars of this invention will be readily suggested to those skilled in the art without departing from the spirit and scope of the invention. A more complete understanding of the invention and many of the attendant advantages thereto will be readily appreciated by reference to the following detailed description when considered in conjunction with the accompanying drawings, wherein like reference numerals refer to like parts and wherein:

FIG. 7 is a perspective view showing how to unlock a torque reducer in accord with one embodiment of the present invention; and FIG. 7A is an enlargement of a portion of FIG. 7 showing how to unlock a torque reducer in accord with one embodiment of the present invention.

DETAILED DESCRIPTION OF THE PREFERRED EMBODIMENT

Detailed descriptions of the preferred embodiment are provided herein.

It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1A:
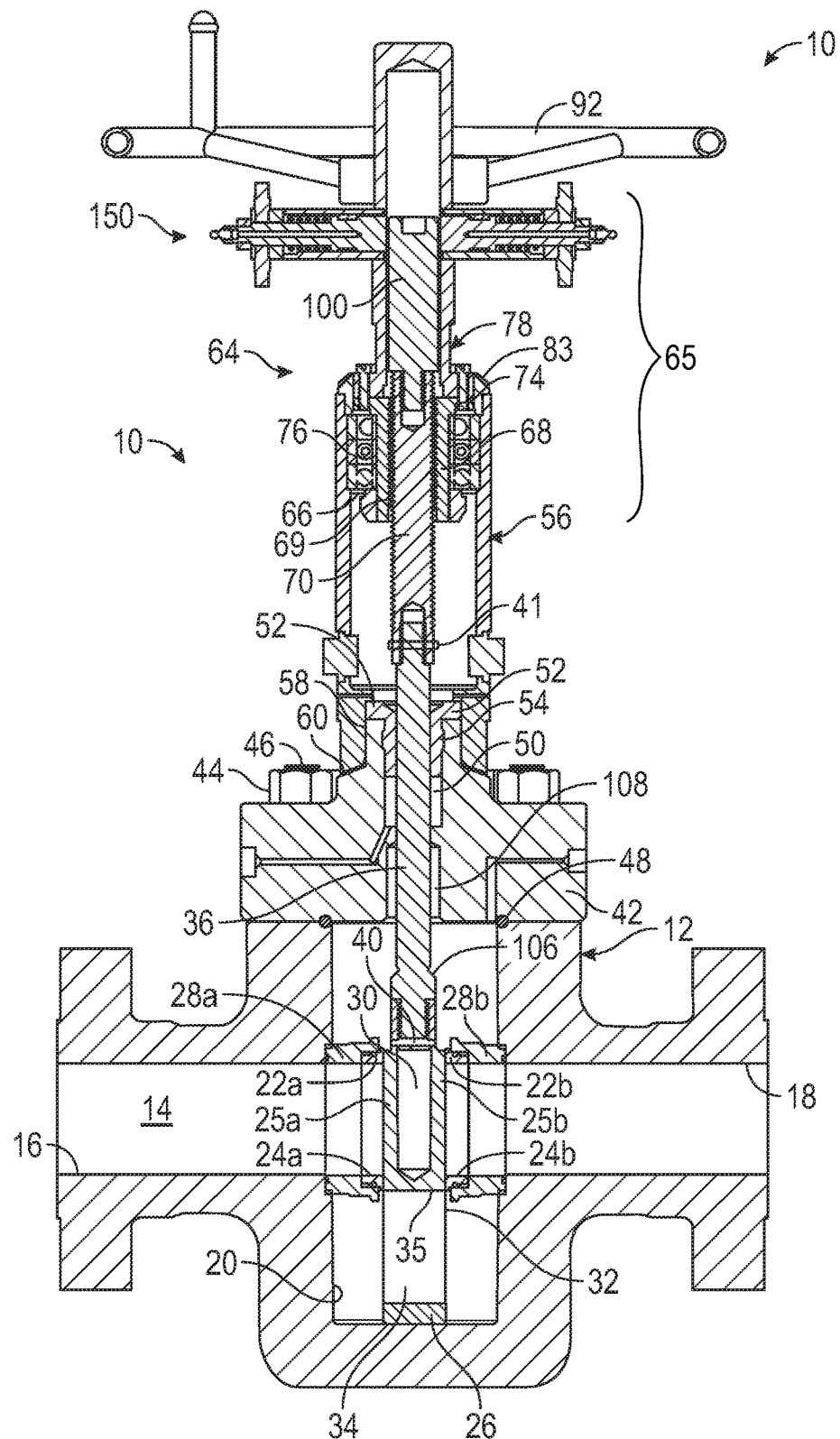
FIG. 1A is an elevational view, in cross-section, that shows a gate valve in the valve closed position and a torque reducer in accord with one embodiment of the present invention.
Figure 1B:
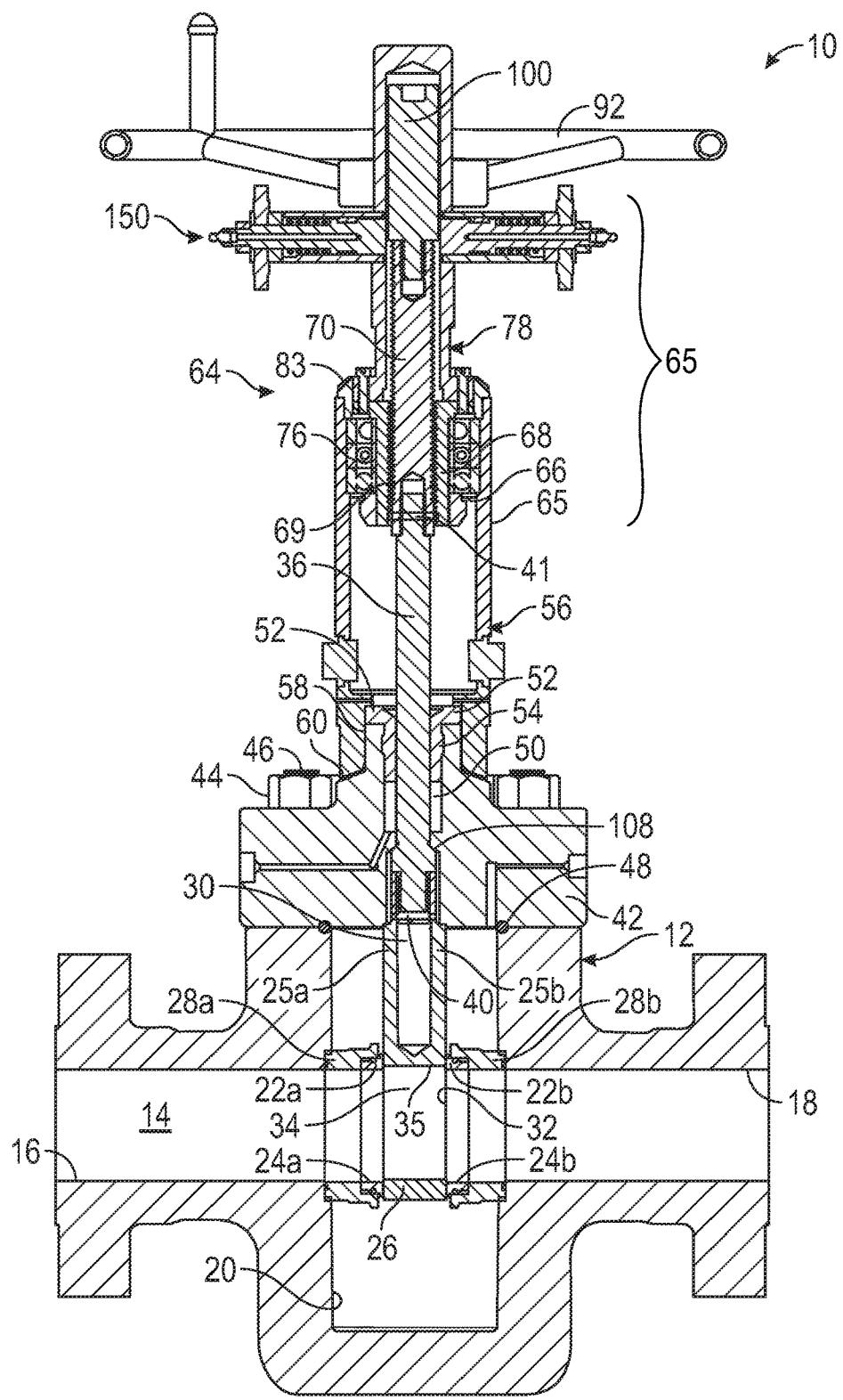
FIG. 1B is an elevational view, in cross-section, that shows the gate valve of FIG. 1A in the valve open position in accord with one embodiment of the present invention.

Referring to FIG. 1A and FIG. 1B, it will be appreciated that FIG. 1A shows the rising stem valve 10 in the valve closed position and FIG. 1B shows the valve 10 in the valve open position.

The high pressure rising stem gate valve of the present invention, which is indicated generally by reference number 10, is shown to comprise a valve body 12 which comprises a flow bore 14 that extends longitudinally through the valve body between a first port 18 and a gate cavity 20 that extends partially through the valve body generally transverse to the flow bore and a second port 16. The gate valve 10 also comprises a pair of seats 22a, 22b that are aligned with the flow bore 14 to thereby define a flow passage through the valve body 12.

Figure 2:
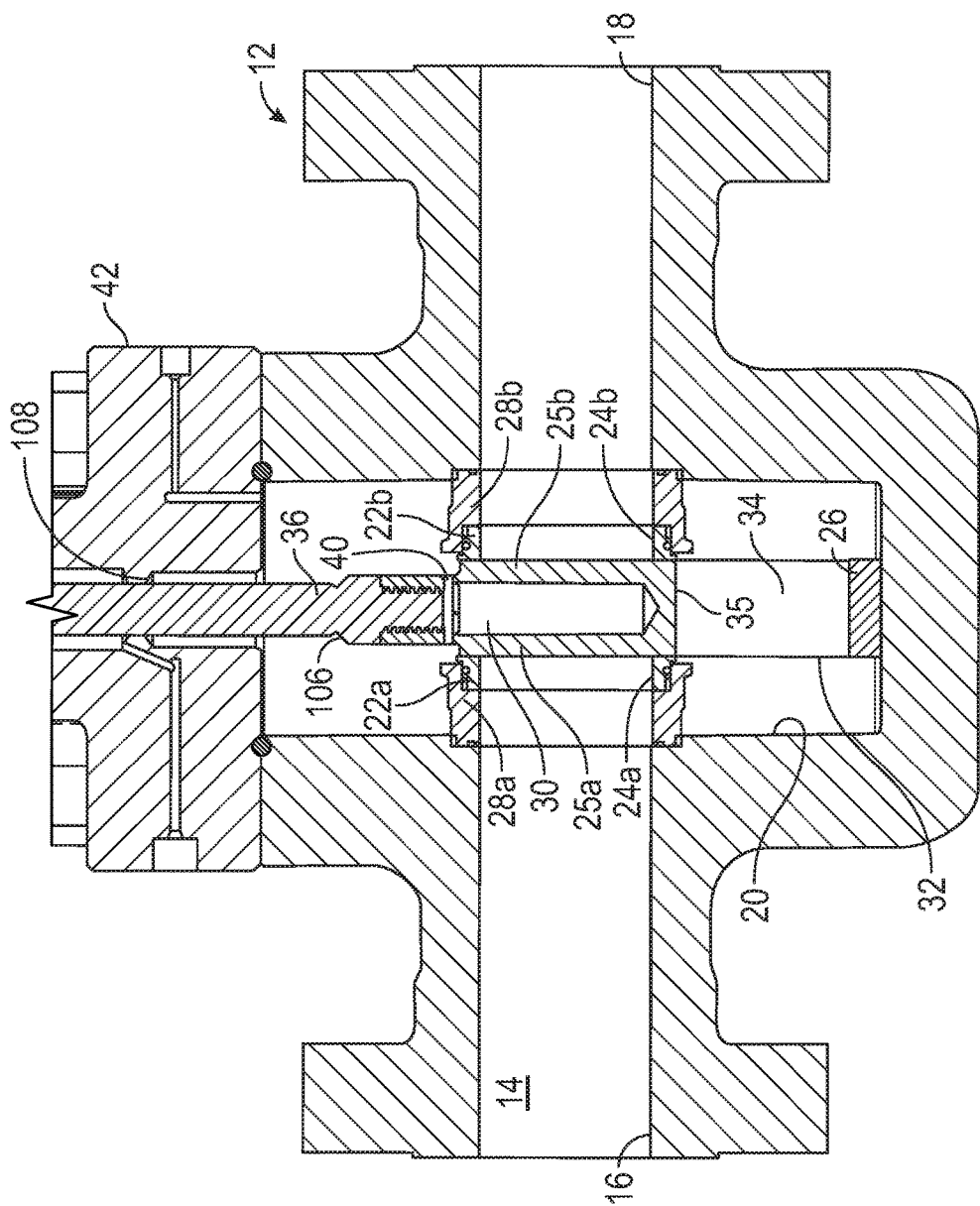
FIG. 2 is an elevational view, in cross-section that shows the lower portion of the gate valve in the closed position in accord with one embodiment of the present invention.

Referring also to FIG. 2, which shows the lower portion of the rising stem gate valve 10, there is shown an enlarged figure of gate 26 which is slidably disposed between the seats 22a, 22b, each of which is preferably urged into contact with the gate 26 by a respective seat retainer 28a, 28b. The gate 26, which in an exemplary embodiment of the invention comprises a generally rectangular configuration, includes an upper end 30, a lower end 32 and a transverse opening 34 that extends completely through the gate proximate the lower end. The gate 26 is secured to rising stem 36. Additionally, the stem 36 is secured against rotation relative to the lift of the gate 26 by a pin 40. Thus any axial movement or translation of the stem 36 will result in a corresponding translation of the gate 26. Further, stem 36 does not rotate with respect to gate 26. Instead, opening and closing of the gate 26 is a result of raising and lowering stem 36.

It will also be appreciated that rising stem 36 is an unbalanced stem due to the absence of a stem on the opposite side of gate as discussed in more detail herein.

The gate 26 is adapted for reciprocal motion between an upper or valve open position as shown in FIG. 1B and a lower or closed position as shown in FIG. 1A. As shown in FIG. 1B, in the valve open position the opening 34 in the lower end 32 of gate 26 is aligned or substantially aligned with the bore surfaces 24a, 24b in the seats 22a, 22b, and fluid is permitted to flow through the flow bore 14 between the first and second ports 16, 18. In the closed position as shown in FIG. 1A, the opening 34 is offset from the tubular bore surfaces 24a, 24b and the gate surfaces 25a, 25b of the upper end 30 of gate 26 thus blocks the flow of fluid through the flow bore 14. Furthermore, since the gate 26 is secured to the stem 36, the gate valve 10 may be selectively opened or closed by raising or lowering the stem because gate valve 10 is a rising stem gate valve.

Referring again to FIG. 1A and FIG. 1B, the rising stem gate valve 10 also includes a bonnet 42 which is secured to the valve body 12 over the gate cavity 20 by suitable means, such as a number of bolts 46 and nuts 44. The bonnet 42 is preferably sealed to the valve body 12 via a bonnet gasket 48. The stem 36 extends upwardly through the bonnet 42 and is sealed there to by a stem packing 50. The stem packing 50 is retained within the bonnet 42 by a packing gland 52, which is threadedly connected to the bonnet generally at threads 54.

Figure 3:
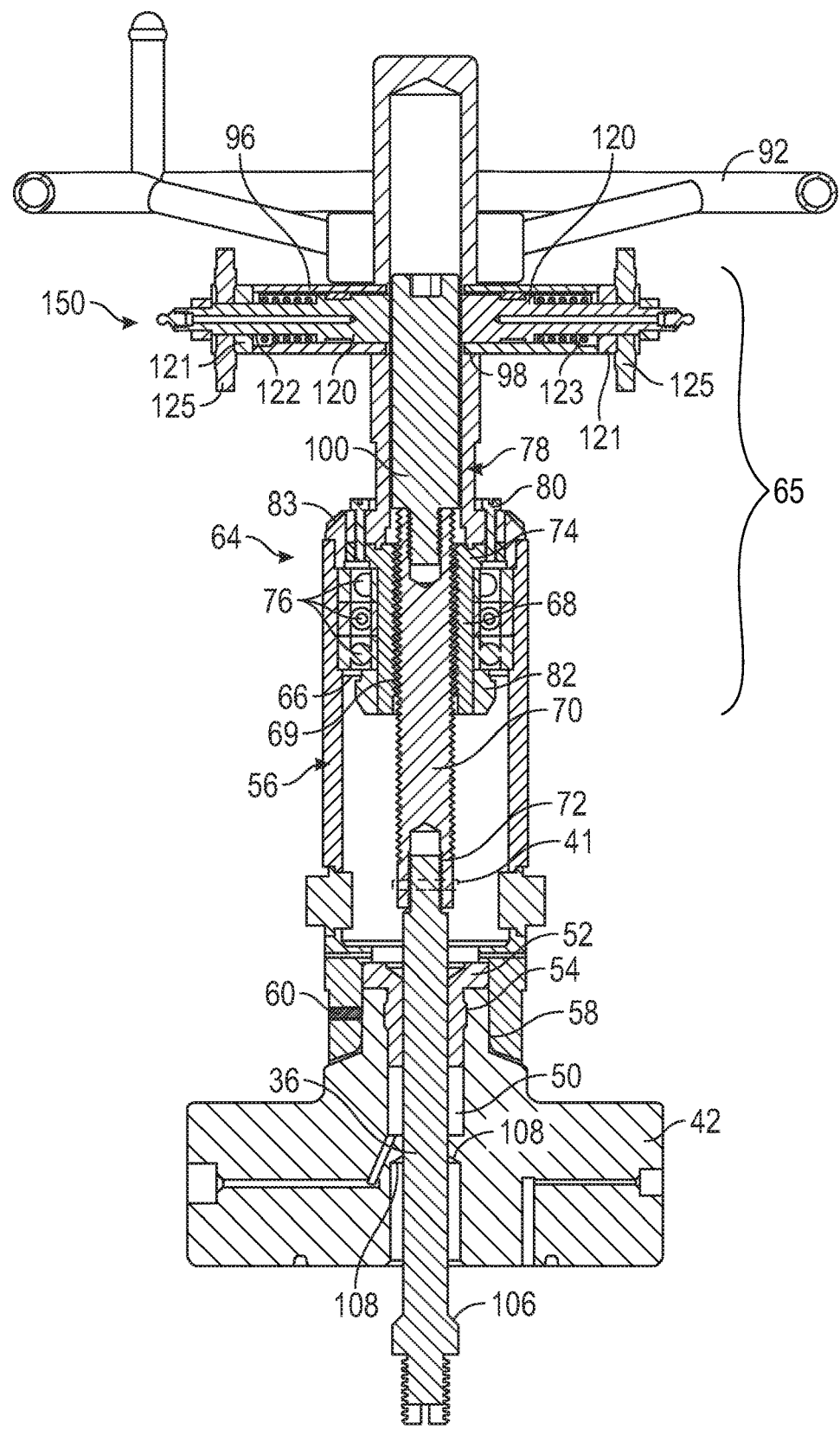
FIG. 3 is an elevational view, in cross-sectional that shows a torque reducer for a gate valve in accord with one embodiment of the present invention.

Referring also to FIG. 3, the gate valve 10 further includes a generally cylindrical housing 56, which is secured to the bonnet 42 such as by threads 58. One or more set screws 60 may be provided to prevent relative rotation between the bonnet cap 56 and the bonnet 42. Bonnet cap 56 may be referred to herein as housing 56.

Referring still to FIG. 3, the gate valve 10 further comprises a Torque reducer assembly 65 which is positioned in between bonnet 42 and hand wheel 92. The Torque Reducer assembly 65 includes a ball screw assembly 64 which has a ball nut 68 which is rotatably connected to ball screw 70. Ball screw nut 68 and ball screw 70 is a presently preferred nut and screw assembly that includes balls to further reduce friction. Ball screw nut 68 may also be referred to herein as a ball nut or a nut, threaded member or the like. Ball screw 70 may be referred to herein more generically as a screw.

Ball screw nut 68 is in surrounding relationship with ball screw 70. In one embodiment of the invention, the ball screw nut 68 and the ball screw 70 comprises spherical balls 69 between ball screw nut 68 and ball screw 70. In this type of ball screw assembly, the ball screw nut 68 and the ball screw 70 comprises corresponding threads and disposed therebetween are a plurality of balls 69 which serve to convert the rotational motion of the ball screw nut 68 into axial movement of the ball screw 70, which in turn axially moves stem 36. Additional features added to the ball screw assembly 64 include the angular contact bearings 76 that are mounted as described herein. The resulting torque of this improved ball screw assembly 64 is lower than ball screw assemblies used in the prior art.

The lower end of the ball screw 70 is connected to the upper end of the stem 36 such as by threads 72. The ball screw 70 and the stem 36 are ideally also pinned together, such as by pin 41, to prevent relative rotation there between. It will be appreciated that other means to secure the axially moveable components together and prevent relative rotation other than pins may be utilized. Thus, it can be appreciated that the ball screw 70, the stem 36, the gate 26 are secured together for simultaneous axial movement as a unit, but these components will not rotate relative to each other.

It will then be appreciated that gate valve 10 is a rising stem gate valve with an unbalanced valve stem 36. As already shown, gate 26 does not include a Balance Stem on the opposite side of gate 26 from unbalanced valve stem 36. As well, an unbalanced valve stem 36 extends through packing 50 on the other side of which can be a much lower pressure than that of the cavity 20 or atmospheric pressure. Therefore an unbalanced force is produced on the valve stem and gate due to the high pressure differential between cavity 20 and the interior of bonnet cap 56 as well as the diameter or cross-sectional area of the valve stem at the packing 50. This is different than use with a valve stem that includes a prior art Balance Stem on the other side of the gate that also extends through another seal on the other side of the gate so that the high pressure in the cavity produces two forces—one on the valve stem and one on the Balance Stem, which largely cancels out each other. Typically the Balance Stem has the same diameter or area but could have a somewhat different diameter or area and produce a significant balancing force. Generally, the Balance Stem would have a radius of at least one-half the radius of the working stem or one-quarter of the area as the Balance Stem extends through the additional seal. Accordingly, as used herein an unbalanced valve stem is defined to have only one stem as pictured above the gate. A Balance Stem (not shown) on the other side of gate 26 below opening 34 could be at least one quarter of the area but preferably closer in size and most preferably of the same diameter or any value in between would extend through another packing (not shown) or another seal or other seal means to produce a balanced force on the gate. Accordingly, the present invention comprises an unbalanced stem so that a substantially or completely unbalanced force is produced on the unbalanced valve stem due to the pressure acting across the cross sectional area of the stem 36 on either side of packing 50.

Looking more closely at ball screw assembly 64, the ball screw nut 68 comprises radially extending flange 74 which is disposed between a set of angular contact bearings 76 and a ball nut driver 78. Angular contact bearings 76 are raceways in the inner and outer rings that are displaced relative to each other in the direction of the bearing axis. This means that they are designed to accommodate combined loads simultaneously, i.e., radial and axial loads. The rising stem gate valve of claim 8, further comprises lock nuts 83 and 82 for loading said angular contact bearing. Lock nut 82 may also be referred to herein as lower nut, bearing lock nut, bottom side bearing lock nut, or bottom lock nut 82.

The rising stem gate valve further comprises a nilos ring 66 positioned adjacent to or below said angular contact bearings 76 and between the angular contact bearings and lower nut 82.

In addition, the radially extending flange 74 is preferably bolted to ball nut driver 78 via Allen head bolts 80 so that the ball screw nut 68, the angular contact bearings 76, radially extending flange 74 and the ball nut driver 78 rotates as a unit. The set of three angular contact bearings 76 are supported on a tower side by bottom side bearing lock nut 82 and on a top side bearing lock nut 83 which is mounted above and below the set of bearings 76 and a nilos ring 66 is placed in between the lowest bearing 76 and bottom lock nut 82. Furthermore top side bearing lock nut 83 is mounted between the ball nut driver 78 and the housing 56. An alemite grease fitting is preferably provided on the top side bearing lock nut 83 for providing lubrication to the ball screw assembly 64. The lock nuts 82, 83 may be used for loading the angular contact bearings 76.

The upper end of the ball nut driver 78 extends beyond the housing 56 and terminates in a hand wheel portion. As shown in FIG. 3, a hand wheel 92 is attached to the ball nut driver 78 by suitable means, such as a pin 91 (See FIG. 7) or the like.

Figure 5:
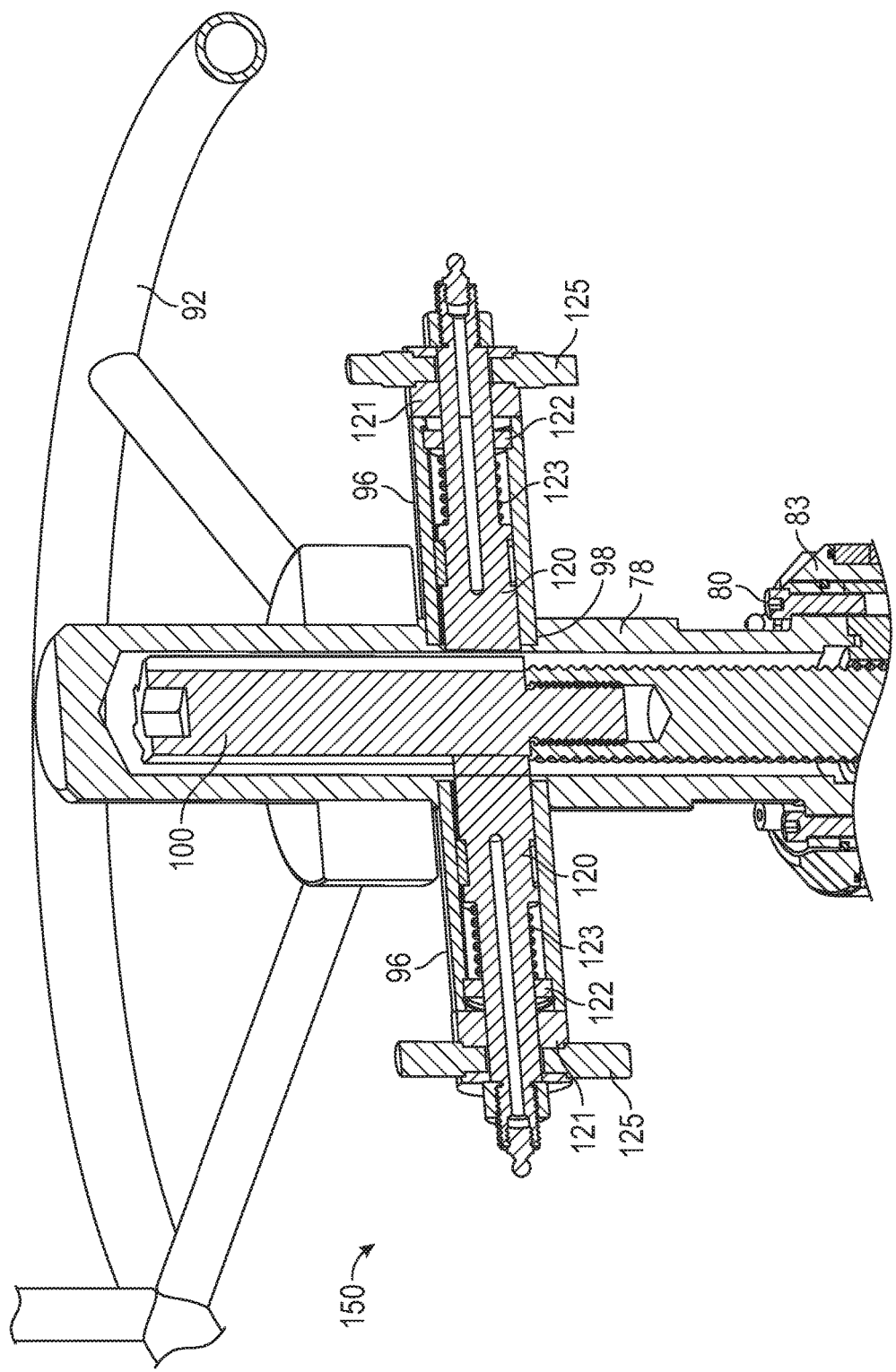
FIG. 5 is an elevational view, partially in cross-section, of a torque reducer in accord with one embodiment of the present invention.
Figure 6:
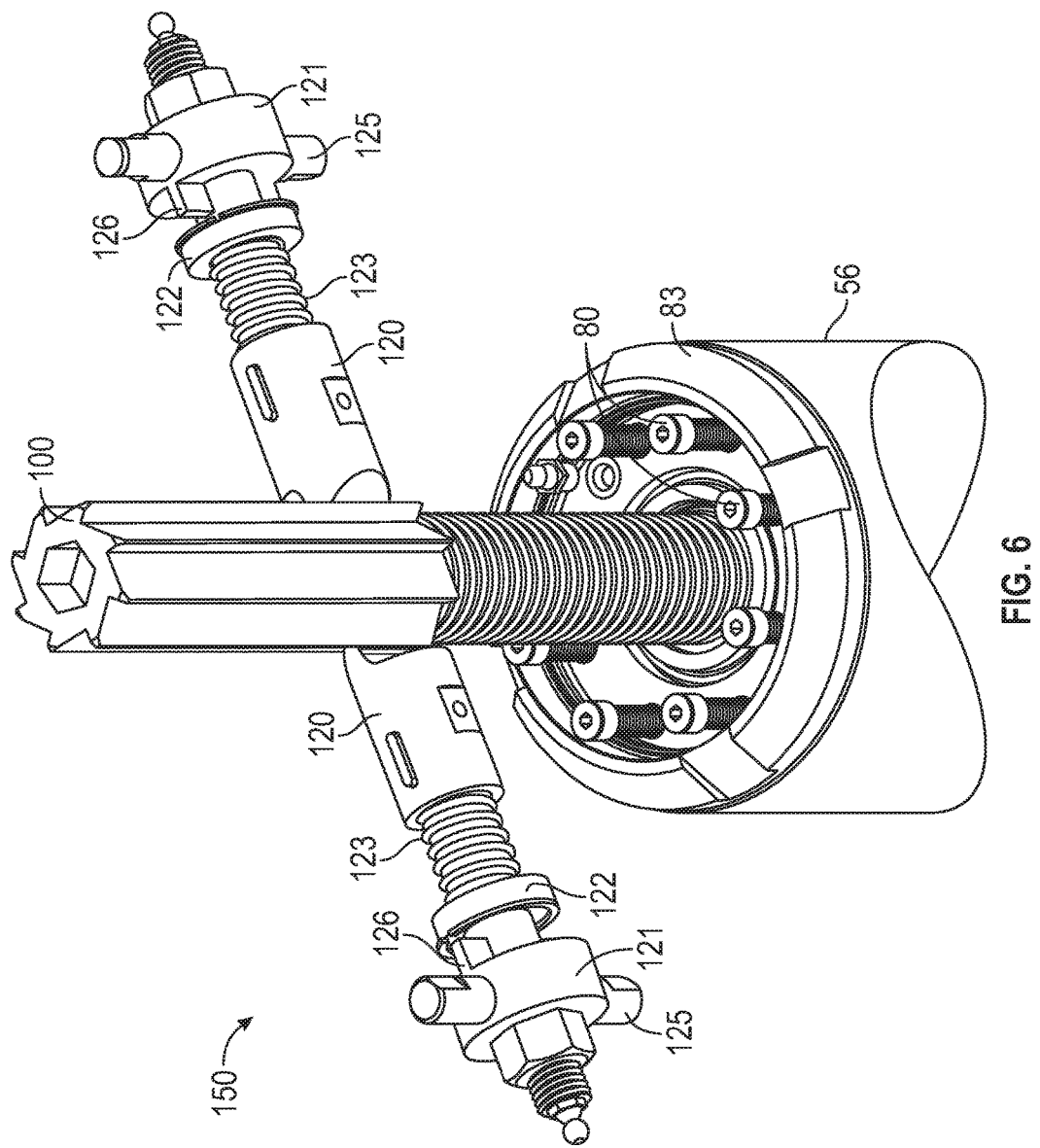
FIG. 6 is a perspective view of a torque reducer in accord with one embodiment of the present invention.

The Torque Reducer Assembly 65 also includes plunger-gear shaft assembly 150, which includes a plunger housing 96 that is preferably welded to the ball nut driver 78 generally at 98 (as shown in FIG. 5).

Referring to FIG. 3, FIG. 4, FIG. 5, FIG. 6, FIG. 8A, and FIG. 8B, the plunger housing 96 includes two plungers 120, two plunger bushings 121, two retaining rings 122, and two springs 123 which in the locked position locks the gear shaft 100 from open rotations, which may be counter-clockwise in one embodiment. Springs 123 urge or bias plungers 120 into engagement with gear shaft 100. The two plungers 120, plunger bushings 121, retaining rings 122, and springs 123 on opposite sides of gear shaft 100 are identical or substantially identical so that it is only necessary to describe one side.

Figure 8A:
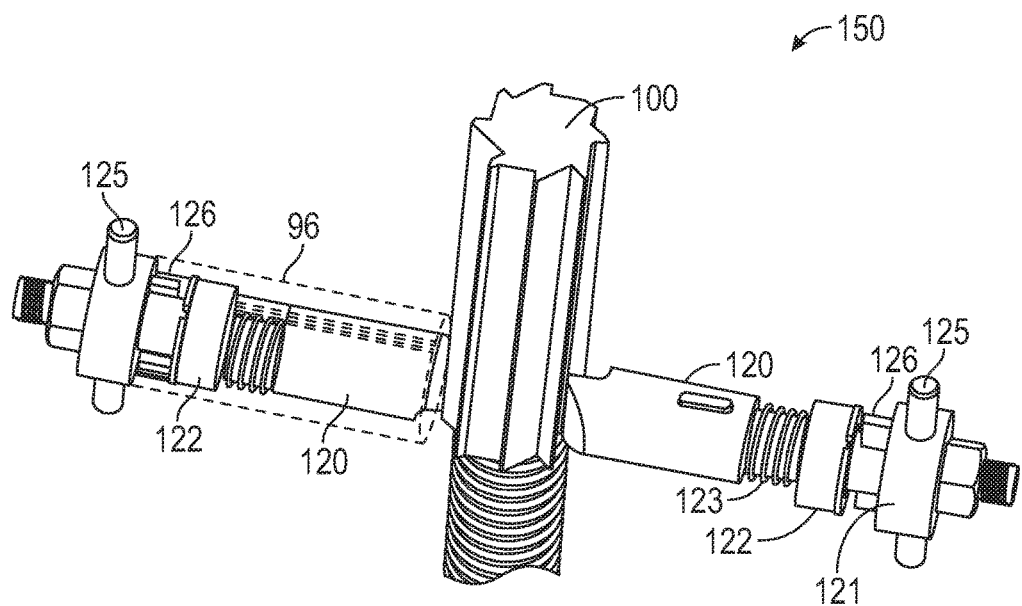
FIG. 8A is a perspective view showing a gear plunger assembly in a locked position in accord with one embodiment of the present invention.
Figure 8B:
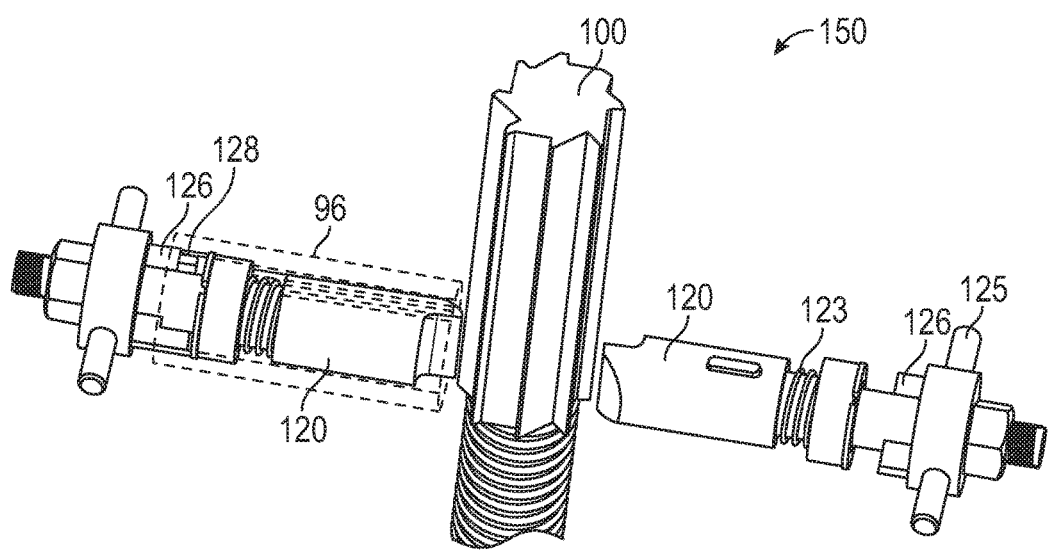
FIG. 8B is a perspective view showing a gear plunger assembly in an unlocked position in accord with one embodiment of the present invention.

The plungers may be in an engaged position or locked radially inward position as shown in FIGS. 1A, 1B, 3, 4, 5, 6, and 8A. The plungers may also be in disengaged position or unlocked radially outward or disengaged position as shown in FIG. 8B. FIGS. 7 and 7A shows how the plungers are moved from the engaged position to the disengaged position or vice versa.

The gear shaft 100 that engages with plungers 120 is provided to restrict the opening of gate valve 10 automatically due to the low torque of ball screw mechanism 64, i.e., to stop the rotation of the ball nut driver 78 towards the valve open position due to force acting on unbalanced rising stem 36. In the locked or engaged position, the plunger-gear shaft assembly 150 allows rotation to close the valve, e.g. clockwise, but prevents rotation in the opposite direction, e.g. anti-clockwise, to open the valve.

As perhaps most clearly shown in FIG. 7, 7A, 8A, 8B, the plunger handles 125 on both sides are used to lock and unlock the plunger gear shaft assembly 150. For unlocking, as indicated in FIG. 7, 7A the plunger handles 125 are pulled outwardly from deep slots 130, rotated such as clockwise, and released so that tabs 126 engage the short slots 128. This causes plungers 120 to be pulled outwardly from gear shaft 100 to a disengaged or offset or unlocked position as shown in FIG. 8B. For the engaged or locking position, the plunger handles 125 and tabs 126 are pulled outwardly from the short slots 128 and rotated to deep slots 130 and released to the engaged or locked position shown in FIG. 8A and other figures where plungers 120 engage gear shaft 100. The plungers 120 should always be kept in the locked or engaged position except during opening of the valve.

A primary purpose of plunger gear shaft assembly 150 is to stop the valve from opening automatically due to low torque of ball screw mechanism and also due to unbalanced stem 36. Whenever gate cavity 20 is pressurized an unbalanced force is applied to unbalanced stem 36 that would otherwise operate to open gate valve 10. In other words, because the gate valve 10 is an unbalanced rising stem gate valve, fluid pressure in the gate cavity 20 will impart an upward force on the stem 36. Since the ball screw assembly 64 is somewhat susceptible to back drive, this upward force could move the gate 26 upwards toward the valve open position. Therefore, the Gear-plunger mechanism 150 should be selected to restrict the rotational drag on the ball nut driver 78 towards the open rotational directional direction, which may preferably be in the anti-clockwise direction.

Figure 4:
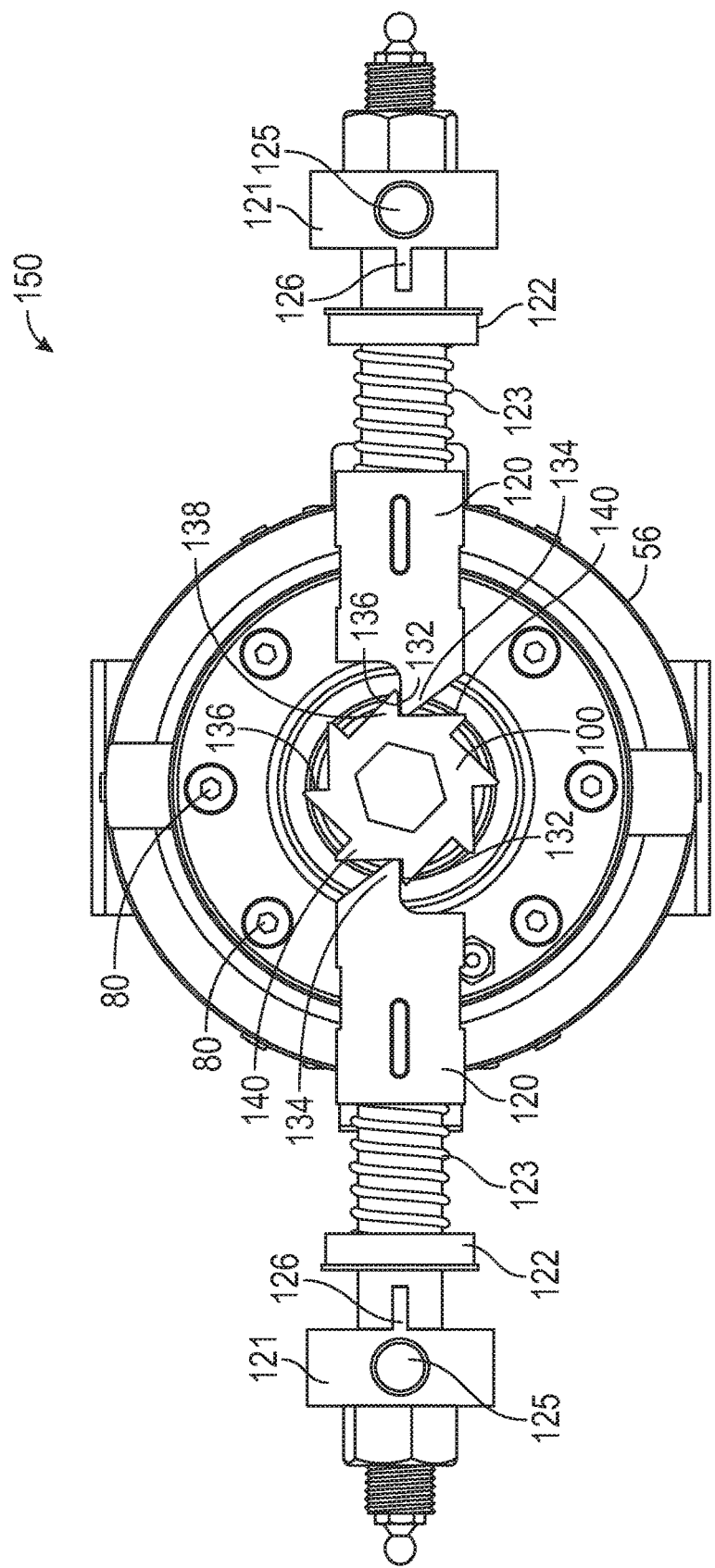
FIG. 4 is a plan view, partially in cross-section, of a torque reducer for a gate valve in accord with one embodiment of the present invention.

Looking at FIG. 3 and FIG. 4, for example, blocking tooth surface 132 of plunger tooth 134 engages corresponding blocking gear surface 136 of gear tooth 138 to prevent rotation of ball nut driver 78 in the anti-clockwise direction in the shown embodiment. Blocking tooth 134 is shown on both plungers 120. Because gear shaft 100 and ball nut driver 78 cannot rotate in the anti-clockwise direction, it will be appreciated that stem 36 does not move towards the valve open position. In other words, because plunger housing 96 is operationally secured to nut 68 via nut driver 78 and radially extending flange 74 with bolts 80, nut 68 cannot rotate in the direction of the open position. On the other hand, non-blocking or sliding gear surface 140 does not prevent rotation in the clockwise position. In this example, non-blocking gear or sliding surface 140 is at a 90 degree angle with respect to blocking gear surface 136, which is shown on two different gears in FIG. 4. However the construction/design of gear shaft 100 is such that it allows clockwise rotation (for closing of valve) and blocks anti-clockwise rotation (for opening of valve). In the engagement position, spring 123 urges or biases gear tooth 134 into contact with gear shaft 100 regardless of clockwise rotation.

The normal operation of the gate valve 10 will now be described. In order to open the gate valve 10, an operator unlocks or disengages the plunger 120 from gear shaft 100 by rotating the plunger handle 125 to place plunger gear shaft assembly 150 in the unlocked or disengagement position as shown in FIG. 8B in the manner indicated in FIG. 7, 7A.

An operator then applies a torque to the hand wheel 92, in this case in the anti-clockwise rotation to open rising stem valve gate 10. Because hand wheel 92 is secured to plunger housing 96 and ball nut driver 78, this torque is transmitted to the ball nut driver 78 and then to the ball screw nut 68 and the angular contact bearings 76. It will be appreciated that plunger housing 96 rotates around gear shaft 100 during opening and closing of the valve. Accordingly the plungers are operatively connected for rotation around gear shaft 100. It will also be appreciated that there is a one to one turn ratio or absence of a gear ratio, which may be a 6:1 ratio in prior art high pressure gate valves.

As described above, the ball screw assembly 64 serves to convert the torque on the ball screw nut 68 into an upward axial force on the ball screw 70. The resulting downward axial reaction force on the ball screw nut 68 is transmitted through the angular contact bearing 76, and the bonnet 42 to the valve body 12. Consequently, less applied torque is required at the hand wheel 92 in order to actual the gate valve 10.

As the hand wheel 92 is actuated to open the gate valve 10, the resulting upward axial force on the ball screw 70 is transmitted through the stem 36, the pin 40, and to the gate 26. As the torque applied to hand wheel 92 is increased, the upward axial force on the gate 26 increases. The gate 26 and the ball screw 70 begins to axially move when this upward force is sufficient to overcome the sum of the gate-to-seat drag between the gate 26 and the seats 22a, 22b and the stem-to-packing drag between the stem 36 and the packing 50. Accordingly, the gate 26, the unbalanced stem 36, the ball screw 70 and gear shaft 100 will begin to rise towards the open position.

At this point, the advantage of using an unbalanced stem 36 with a standard gate 26 (which does not have a Balance Stem on the opposite side of gate 26 from stem 36), with the gate opening 34 proximate the lower end 32 will become apparent. In gate valves with Balanced Stems, significantly greater force is required to open the valve than to close the valve. This is because in the closed position the full deferential pressure across the gate creates the greatest gate-to-seat drag. However, by using a standard gate 26 in the gate valve of the present invention, the upward force acting on the unbalanced stem 36 will help to move the gate into the open position.

As the operator continues to apply torque to the hand wheel 92, the hand wheel will rotate and the gate 26 will rise. For simplicity sake, let us assume that the high pressure side of the gate valve 10 is to the left of the gate 26 (as viewed in the FIG. 1A and FIG. 1B). Thus, when the gate valve 10 is open as shown in FIG. 1B, flow will proceed through the flow bore 14 from the second port 16 to the first port 18. As discussed above, when the upper edge 35 of gate opening 34 reaches the inner surface bore 24b in the downstream seat 22b, a high velocity jet of fluid will be forced through the intersection of the gate opening and the bore. Therefore, it is desirable to raise the gate 26 as quickly as possible in order to minimize any erosion which may be caused by this jet of fluid.

The Torque Reducer assembly 65 requires substantially fewer turns on the hand wheel 92 in order to raise a ball screw 70 the distance required to fully open the gate 26. Thus assuming the operator turns the hand wheel 92 at a constant rate, the gate 26 will rise substantially faster and be much easier to rotate in the gate valve 10 than in other gate valves with Balance Stems and gear boxes. Consequently, erosion of the gate opening 34 and the bore 24b of the downstream seat 22b will be minimized.

As the gate 26 is raised still further, the gate opening 34 will eventually become substantially aligned with bores 24a, 24b, in the seats 22a, 22b as shown in FIG. 1B. In this configuration, the gate valve 10 is fully open and fluid may flow freely through the flow bore 14.

As the gate 26 reaches its fully open position, a backseat surface 106 on the stem 36 will engage a corresponding backseat surface 108 on the bonnet 42 and create a metal-to-metal backseat seal. At this point, an additional advantage to using a standard gate 26 or unbalanced stem 36 will become apparent. With the gate valve 10 thus actuated to the open position and simultaneously back seated, pressure may be bled off from both sides of the gate 26 and from the bonnet 42 without having to actuate the gate valve a second time. Thus, fewer steps are required ensuring that no gate pressure exists in the gate cavity 20 and the bonnet 42. Consequently, maintenance and repair function, such as replacing the stem packing 50, may be safely performed more easily and inexpensively with less damage to the gate.

At all times except when opening the gate valve, the plunger-gear assembly is preferably placed in the locked position. As discussed above, the plungers 120 are locked or placed in the engaged position to prevent rotation towards the open position (but not the closed position) by rotating the plunger handles 125 so that the tabs 126 engage the corresponding deep slots 130 as shown in FIG. 7A.

When it is desired to close the gate valve 10, the operator rotates the hand wheel 92 in the opposite direction in a valve close direction, and the gear shaft 100, ball screw 70, stem 36 and the gate 26 are driven downward in a valve close direction toward the valve closed position. Thus, the unbalanced stem force now opposes the motion of the gate 26. However the opposing force is offset by the fact that essentially no gate-to-seat drag exists when the gate valve 10 is open since no differential pressure exists across the gate 26. Moreover, the upward reaction force exerted on the ball screw nut 68 is transmitted through the ball nut driver 78, a set of bearings 76, the housing 56 and the bonnet 42 to the valve body 12 to greatly reduce the torque required in the improved ball screw assembly 64.

The operation speed is very favorable compared to a typical gear operated valve. Prior art gear ratios tend to be in the range of about 6:1. For example, to fully open a 3"-20000 PSI valve, a gear operated valve might require 90 revolutions of hand wheel 92, whereas the torque reducer valve requires only 19 revolutions of a hand wheel or similar mechanism. Further, the torque that must be applied to the hand wheel 92 is considerably less. Accordingly, an operator is able to open the valve according to the present invention considerably several times faster than prior art valves. The present invention may be used with any gate valve including but not limited to rising stem gate valves with an unbalanced stem that controls pressure at any amount. However, the advantages are more readily apparent in high pressures such as anywhere in the range of 5000 psi to 20000 psi.

The foregoing description of the preferred embodiments of the invention has been presented for purposes of illustration and description only. It is not intended to be exhaustive or to limit the invention to the precise form disclosed; and obviously many modifications and variations are possible in light of the above teaching. Such modifications and variations that may be apparent to a person skilled in the art are intended to be included within the scope of this invention as defined by the accompanying claims.

The invention claimed is:

1. A method for providing a rising stem gate valve to control high pressures of at least 5000 psi, said method comprising:
    providing a valve that defines therein a flow bore through said valve and a gate cavity that intersects said flow bore;
    disposing a gate in said gate cavity across said flow bore, said gate being axially moveable between a valve open position to allow flow through said flow bore and a valve closed position to prevent flow through said flow bore;
    providing a valve stem that is axially movable with said gate, said valve stem being fixed from rotation with respect to said gate;
    providing a torque reducer assembly comprising a ball screw assembly and a plunger gear shaft assembly,
    providing that said ball screw assembly comprises,
        providing a ball screw operatively connected to said gate and said valve stem,
        providing that said ball screw is fixed from rotation with respect to said gate and said valve stem, and providing that said ball screw is axially movable with said valve stem and said gate;
        providing a ball screw nut in surrounding relationship to said ball screw,
        providing that said ball screw assembly is connected so that rotation of said ball screw nut in a valve open direction axially moves said gate towards said valve open position, and rotation of said ball screw nut in a valve close direction axially moves said gate toward said valve closed position;
    providing that said plunger gear shaft assembly comprises,
        providing a gear shaft connected to be axially movable with said ball screw, valve stem, and said gate,
        providing that said gear shaft is fixed from rotation with respect to said ball screw, said valve stem, said gear shaft and said gate; and
        providing a plunger operatively connected for rotation around said gear shaft with rotation of said ball screw nut,
        providing that said plunger is movable between an engaged position with said gear shaft and a disengaged position with said gear shaft, in said engaged position said plunger gear shaft assembly being connected to prevent rotation of said ball screw nut in said valve open direction while permitting rotation of said ball screw nut in said valve close direction, in said disengaged position said plunger being disengaged from said gear shaft to permit rotation of said ball screw nut in said valve open direction and said valve close direction.

2. The method of claim 1, further comprising providing that said valve stem comprises an unbalanced valve stem.

3. The method claim 1, further comprising providing that said plunger gear shaft assembly further comprises a spring connected to said plunger to bias said plunger into engagement with said gear shaft.

4. A rising stem gate valve to control high pressures of at least 5000 psi, said rising stem gate valve comprising:
    a valve that defines therein a flow bore through said valve and a gate cavity that intersects said flow bore;
    a gate disposed in said gate cavity across said flow bore, said gate being axially moveable between a valve open position to allow flow through said flow bore and a valve closed position to prevent flow through said flow bore;
    a valve stem that is axially movable with said gate, said valve stem being fixed from rotation with respect to said gate;
    a torque reducer assembly comprising a ball screw assembly and a plunger gear shaft assembly,
    said ball screw assembly comprising
        a ball screw operatively connected to said gate and said valve stem, said ball screw being fixed from rotation with respect to said gate and said valve stem, said ball screw being axially movable with said valve stem and said gate;
        a ball screw nut in surrounding relationship to said ball screw, said ball screw assembly being connected so that rotation of said ball screw nut in a valve open direction axially moves said gate towards said valve open position, and rotation of said ball screw nut in a valve close direction axially moves said gate towards said valve closed position;
    said plunger gear shaft assembly comprising,
        a gear shaft connected to be axially movable with said ball screw, said valve stem, and said gate, said gear shaft being fixed from rotation with respect to said ball screw, said valve stem, said gear shaft and said gate; and
        a plunger operatively connected for rotation around said gear shaft with rotation of said ball screw nut, said plunger being movable between an engaged position with said gear shaft and a disengaged position with said gear shaft, in said engaged position said plunger gear shaft assembly being connected to prevent rotation of said ball screw nut in said valve open direction while allowing rotation in said valve close direction, in said disengaged position said plunger being disengaged from said gear shaft to permit rotation of said ball screw nut in said valve open direction and said valve close direction.

5. The rising stem gate valve of claim 4, further comprising a plurality of plungers moveable between said engaged position and said disengaged position.

6. The rising stem gate valve of claim 4, wherein said plunger gear shaft assembly further comprises a spring connected to said plunger to bias said plunger into engagement with said gear shaft.

7. The rising stem gate valve of claim 4, further comprising said valve stem comprising an unbalanced valve stem.

8. The rising stem gate valve of claim 6, where said plunger gear shaft assembly further comprises a plunger housing, said plunger housing being rotatable around said gear shaft with rotation of said ball screw nut.

9. The rising stem gate valve of claim 8 wherein said plunger gear shaft assembly further comprises a plunger handle operatively connected to said plunger for movement of said plunger between said engaged position and disengaged position.

10. The rising stem gate valve of claim 8 further comprising a hand wheel secured to a ball nut driver for rotation with said plunger housing, said hand wheel being operatively connected to said ball screw nut so that said ball nut driver, said plunger housing and said ball screw nut rotate together at the same speed.

11. The rising stem gate valve of claim 4 further comprising an angular contact bearing in surrounding relationship to said ball screw assembly.

12. The rising stem gate valve of claim 11, further comprising lock nuts for loading said angular contact bearing.

13. The rising stem gate valve of claim 11, further comprising a nilos ring positioned adjacent to said angular contact bearing.

14. The rising stem gate valve of claim 11, further comprising a nut driver operatively connected to said plunger housing, wherein said ball screw nut comprises a radially extending flange, said radially extending flange being disposed between said angular contact bearing and said nut driver, said nut driver being operatively connected to said radially extending flange for rotation with said radially extending flange.

15. The rising stem gate valve of claim 11, further comprising a housing, wherein said ball screw assembly and said angular contact bearing are positioned in said housing, a bonnet secured to said housing, said bonnet comprising a seal through which said valve stem extends.

16. The rising stem gate valve of claim 15, further comprising a first backseat surface which is integral with said valve stem and a second backseat surface which is integral with said bonnet, wherein axial movement of said valve stem to said valve open position will bring said first backseat surface and second backseat surface into engagement to thereby form a backseat seal between said valve stem and said bonnet.

* * * * *